United States Patent
Blessing et al.

(10) Patent No.: US 12,151,755 B2
(45) Date of Patent: Nov. 26, 2024

(54) STEERING KNUCKLE OF A UTILITY VEHICLE

(71) Applicant: KNORR-BREMSE Systeme fuer Nutzfahrzeuge GmbH, Munich (DE)

(72) Inventors: Michael Blessing, Munich (DE); Markus Gruber, Ebersberg (DE); Stefan Kemmler, Tuebingen (DE); Matthias Klingner, Moorenweis (DE); Jakob Lachermeier, Freising (DE); Wolfgang Pahle, Bad Wiessee (DE); Edgar Ruhl, Ingolstadt (DE); Robert Trimpe, Wessling (DE); Alexander Werth, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 502 days.

(21) Appl. No.: 17/595,740

(22) PCT Filed: May 14, 2020

(86) PCT No.: PCT/EP2020/063473
§ 371 (c)(1),
(2) Date: Nov. 23, 2021

(87) PCT Pub. No.: WO2020/239461
PCT Pub. Date: Dec. 3, 2020

(65) Prior Publication Data
US 2022/0219755 A1    Jul. 14, 2022

(30) Foreign Application Priority Data
May 24, 2019   (DE) .................... 10 2019 113 939.2

(51) Int. Cl.
*B62D 7/18*    (2006.01)
*B60B 27/00*   (2006.01)
(Continued)

(52) U.S. Cl.
CPC ............ *B62D 7/18* (2013.01); *B60B 27/0005* (2013.01); *B60B 27/0063* (2013.01);
(Continued)

(58) Field of Classification Search
CPC ............................. F16D 65/0062; B62D 7/18
See application file for complete search history.

(56) References Cited

U.S. PATENT DOCUMENTS

| 5,911,425 A | 6/1999 | Hofmann et al. |
| 6,398,241 B1 | 6/2002 | Mahnig et al. |
(Continued)

FOREIGN PATENT DOCUMENTS

| CN | 101808878 A | 8/2010 |
| CN | 201901174 U | 7/2011 |
(Continued)

OTHER PUBLICATIONS

Korean-language Office Action issued in Korean Application No. 10-2021-7041717 dated Aug. 15, 2023 with English translation (7 pages).
(Continued)

*Primary Examiner* — Nicole T Verley
(74) *Attorney, Agent, or Firm* — Crowell & Moring LLP

(57) ABSTRACT

A steering knuckle of a utility vehicle, composed of a cast material, has a main body, a steering knuckle bearing, a hub-type, cup-shaped receiving portion, open towards a rim of a vehicle wheel and suitable for receiving an anti-friction bearing and a bearing journal, and a pad-receiving portion for receiving a brake pad. The pad receiving portion has a support and two supporting elements provided one behind the other in the rotational direction of the vehicle wheel. A control arm attachment for linking an axle guide is formed on the main body.

6 Claims, 5 Drawing Sheets

(51) Int. Cl.
  *B60B 27/02*   (2006.01)
  *B60B 35/00*   (2006.01)
  *F16D 65/00*   (2006.01)
  *F16D 65/095*  (2006.01)
  *F16D 55/00*   (2006.01)

(52) U.S. Cl.
  CPC ............ *B60B 27/02* (2013.01); *B60B 35/003* (2013.01); *F16D 65/0062* (2013.01); *F16D 65/095* (2013.01); *F16D 2055/0012* (2013.01)

(56) References Cited

U.S. PATENT DOCUMENTS

| | | |
|---|---|---|
| 2010/0007108 A1 | 1/2010 | Kwon |
| 2010/0207341 A1 | 8/2010 | Murata |
| 2016/0297272 A1 | 10/2016 | Hinz |
| 2018/0015782 A1 | 1/2018 | Heraudet et al. |
| 2022/0258797 A1 * | 8/2022 | Gruber .................. B62D 7/18 |

FOREIGN PATENT DOCUMENTS

| | | | |
|---|---|---|---|
| CN | 202413912 U | | 9/2012 |
| CN | 202783361 U | | 3/2013 |
| CN | 203306092 U | | 11/2013 |
| CN | 103979013 A | | 8/2014 |
| CN | 204110142 U | | 1/2015 |
| CN | 106364260 A | | 2/2017 |
| CN | 108973564 A | | 12/2018 |
| CN | 112009566 A | * | 12/2020 ............... B22F 5/00 |
| CN | 116552635 A | * | 8/2023 |
| DE | 43 14 311 A1 | | 11/1994 |
| DE | 195 38 212 A1 | | 4/1997 |
| DE | 10 2004 034 565 A1 | | 2/2006 |
| DE | 10 2007 047 794 A1 | | 5/2009 |
| DE | 10 2015 204 739 A1 | | 9/2016 |
| DE | 10 2015 210 969 A1 | | 12/2016 |
| DE | 102020000597 A1 | * | 9/2020 |
| EP | 1 075 991 A2 | | 2/2001 |
| EP | 2 644 927 A1 | | 10/2013 |
| EP | 2 651 747 B1 | | 7/2019 |
| JP | 2018-508419 A | | 3/2018 |
| WO | WO 2012/082020 A1 | | 6/2012 |
| WO | WO 2016/034377 A1 | | 3/2016 |
| WO | WO 2016/153988 A1 | | 9/2016 |
| WO | WO 2018/154502 A1 | | 8/2018 |

OTHER PUBLICATIONS

Russian-language Office Action with Search Report issued in Russian Application No. 2021138371/11(080378) dated Jul. 20, 2022 with English translation (seven (7) pages).

International Search Report (PCT/ISA/210) issued in PCT Application No. PCT/EP2020/063473 dated Aug. 4, 2020 with English translation (six (6) pages).

German-language Written Opinion (PCT/ISA/237) issued in PCT Application No. PCT/EP2020/063473 dated Aug. 4, 2020 (six (6) pages).

German-language Office Action issued in German Application No. 10 2019 113 939.2 dated Apr. 15, 2020 (seven (7) pages).

Chinese-language Office Action issued in Chinese Application No. 202080038105 dated Feb. 4, 2023 with English translation (10 pages).

Japanese-language Office Action issued in Japanese Application No. 2021-569539 dated Dec. 6, 2022 with English translation (11 pages).

International Preliminary Report on Patentability (PCT/IB/338 & PCT/IB/373) issued in PCT Application No. PCT/EP2020/063473 dated Dec. 2, 2021, including English translation of document C2 (German-language Written Opinion (PCT/ISA/237), filed on Nov. 23, 2021) (seven (7) pages).

* cited by examiner

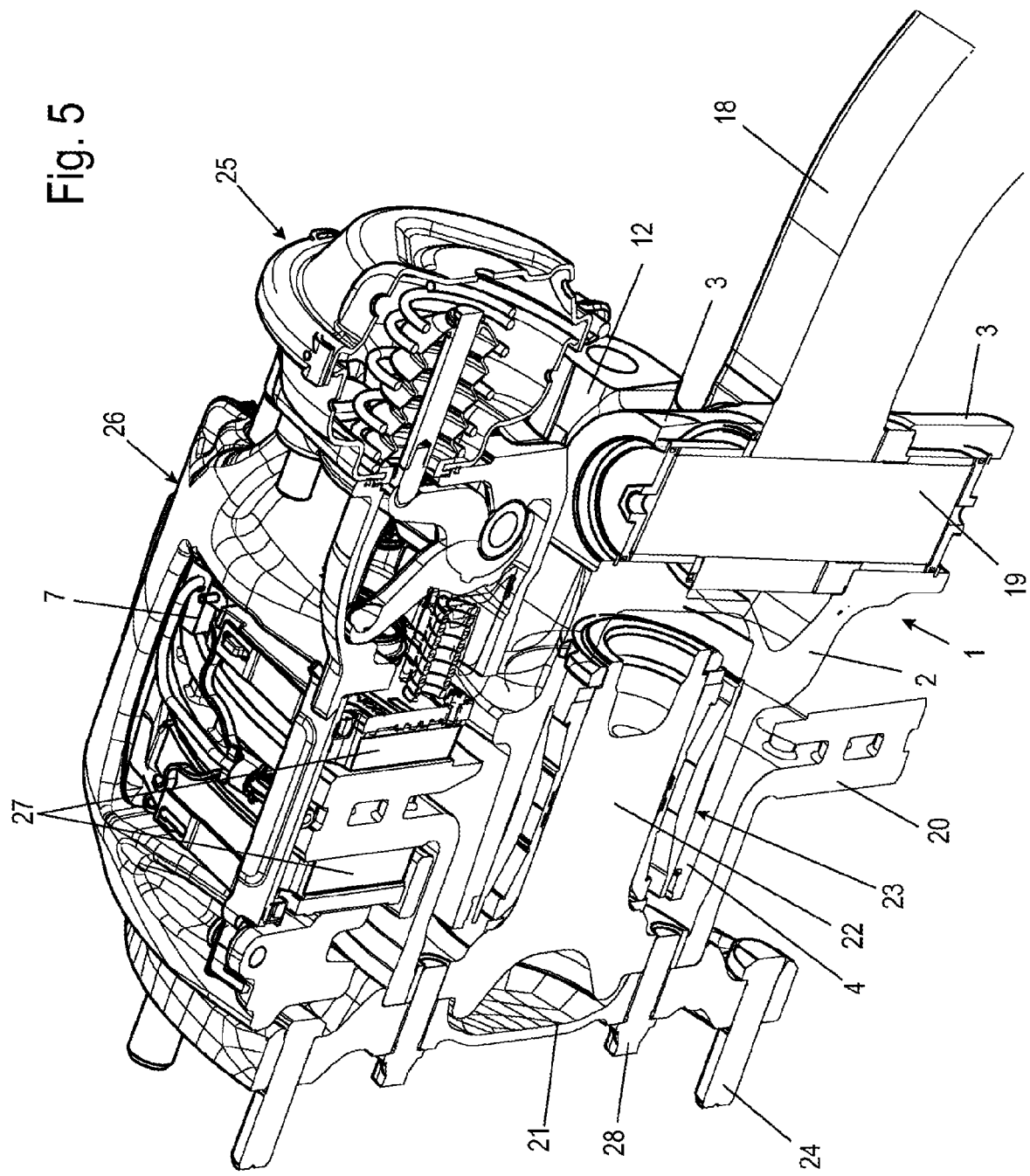

STEERING KNUCKLE OF A UTILITY VEHICLE

BACKGROUND AND SUMMARY OF THE INVENTION

The present invention relates to a steering knuckle, composed of a casting material, of a utility vehicle.

Steering knuckles for utility vehicles are usually made of steel, in particular by virtue of the high, diverse and changing loads. The shaping and fine detailing are usually highly limited in the design of forged parts.

Such forged steering knuckles are usually composed of a simple main body having journals and arms, which are usually embodied so as to be rectilinear, attached thereto, because the desired geometry has to be achieved by forming in as few strokes as possible in order for the shape to be produced from a forged blank such as, for example, a cylindrical bar or a rectangular billet.

The steel is imparted the high load bearing capability thereof by alloying elements and the forming process is, however, limited in terms of shaping and is highly cost intensive by virtue of the heat that has to be introduced into the material and the production process when forging.

The high load bearing capability here is necessary for being able to absorb loads of a lateral crash in which a vehicle wheel impacts an edge, such as a curb, for example, transversely to the running direction. Such a load is in particular tested during the so-called curb-impact test, the latter simulating the utility vehicle sliding and impacting a curb perpendicularly to the travel direction.

In order for the above-mentioned disadvantages to be avoided, a steering knuckle which is made from a casting material and has a main body that in regions is configured in the shape of a plate, a steering knuckle bearing, as well as hub-type receptacle for receiving a roller bearing and an axle journal is known from DE 10 2004 034 565 A1. Moreover, a brake mount bridge for receiving brake pads that are disposed on both sides of a brake disc is molded on the steering knuckle.

It is an object of the present invention to improve a steering knuckle, composed of a casting material, of a utility vehicle in particular in terms of the weight and the stability of said steering knuckle such that the latter withstands the stress of a lateral impact even at temperatures below zero, in particular at temperatures below −40° Celsius.

This object is achieved by a steering knuckle, composed of cast iron, having the features of the independent claim.

The steering knuckle according to the invention has a main body, a steering knuckle bearing, as well as a hub-type receptacle which, in the shape of a pot for receiving a roller bearing and an axle journal, is open toward a rim of a vehicle wheel.

The steering knuckle furthermore has a pad receptacle for receiving a brake pad. The pad receptacle has a support face and two support elements that are disposed in succession in the rotating direction of the vehicle wheel.

A control arm attachment for attaching an axle control arm is furthermore molded on the main body of the steering knuckle.

Such a steering knuckle is distinguished by the great variability in terms of shaping the latter by virtue of the casting material. Simple assembly is enabled by molding a pad receptacle and a control arm attachment thereon, because the control arm attachment and at least a part of a brake mount serving for receiving the pad do not have to be separately assembled.

Moreover, doubling up of material, in particular in the region of the pad receptacle and of the control arm attachment, can be dispensed with.

Advantageous variants of embodiment of the invention are the subject matter of the dependent claims.

According to one advantageous variant of embodiment of the invention, the control arm attachment is molded laterally to the steering knuckle bearing, so as to extend from the main body.

According to one advantageous refinement, the control arm attachment is configured as an arm protruding from a main body of the steering knuckle, having a bore on the free end of said arm.

According to one further advantageous variant of embodiment, the main body has at least one cutout, this enabling further optimization in terms of the weight of the steering knuckle.

According to one further advantageous variant of embodiment, a cavity provided with ribs is molded on the main body in the region of the steering knuckle bearing.

Further optimization in terms of weight is made possible as a result of the molding of the cavity, on the one hand.

The cavity with ribs guarantees the required stability of the steering knuckle.

According to one further advantageous variant of embodiment, a cavity is molded on the main body in the region of the pad receptacle, between the support faces.

This cavity also enables further optimization in terms of the weight of the steering knuckle.

According to one further advantageous variant of embodiment, the main body has an overlap region for engaging across a brake disc.

In one further embodiment, the control arm attachment is fitted in the region of the disc overlap.

According to one advantageous refinement, this overlap region on the end face thereof that faces the vehicle wheel is configured as a flange for fitting a portion of a brake mount.

This enables the variable use of such a steering knuckle for brake pads that are to be attached on both sides of a disc brake as well as for such brake pads that are disposed on only one side.

Preferred exemplary embodiments of the invention will be explained in more detail hereunder by means of the appended drawings.

BRIEF DESCRIPTION OF THE DRAWINGS

FIG. 5 is a schematic perspective illustration of the steering knuckle shown in FIGS. 3 and 4, having a disc brake disposed on said steering knuckle.

DETAILED DESCRIPTION OF THE DRAWINGS

In the description of the figures hereunder, terms such as top, bottom, left, right, front, rear, etc., refer exclusively to the exemplary illustration and position of the steering knuckle, the main body, the steering knuckle bearing, the receptacle, the pad receptacle, the control arm attachment and the like chosen in the respective figures. These terms are not to be understood as limiting, i.e. the references may change as a result of different operating positions or the mirror-symmetrical design or the like.

A steering knuckle of a utility vehicle is overall identified by the reference sign 1 in FIGS. 1 to 5, said steering knuckle being composed of a casting material.

Figure 1:
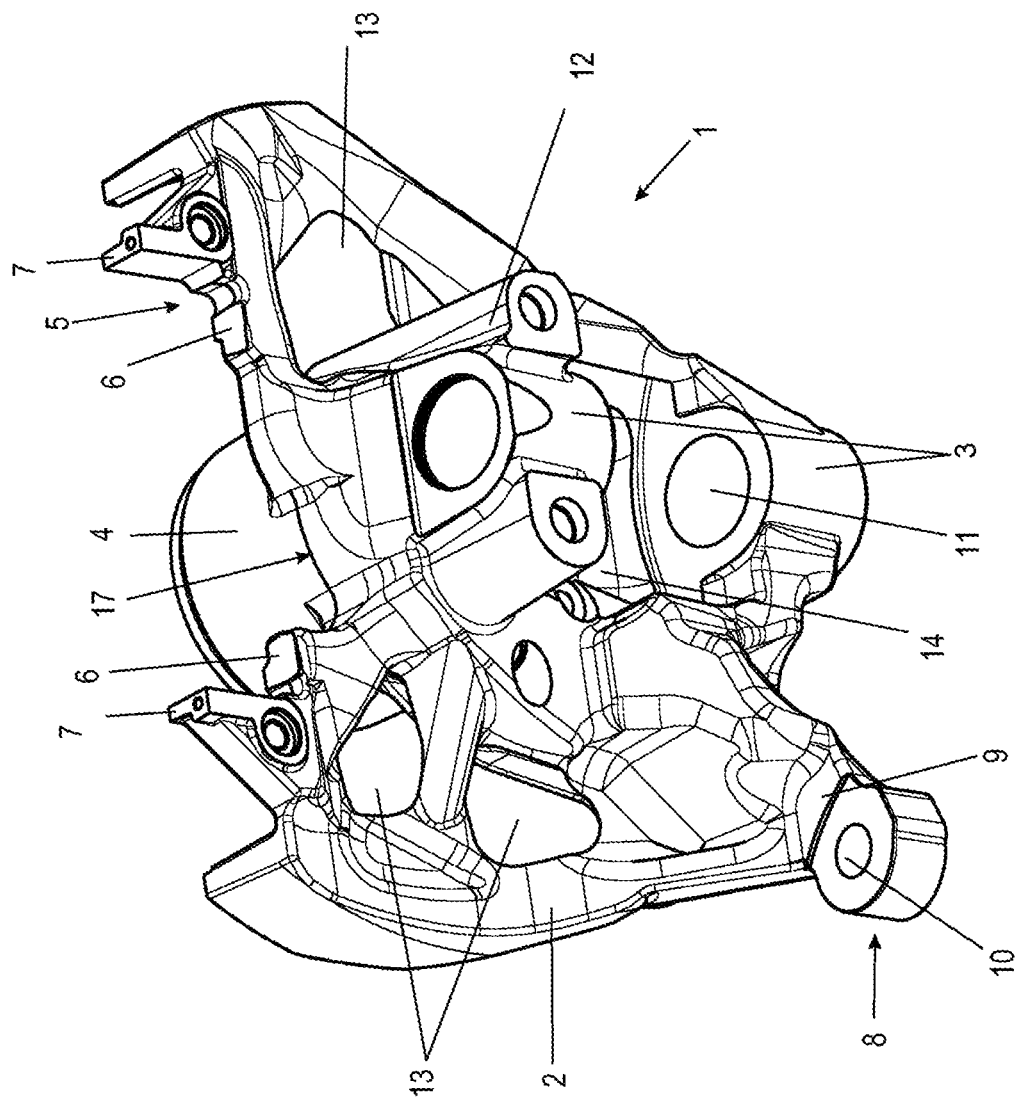
FIGS. 1 and 2 are schematic perspective illustrations of a first embodiment of a steering knuckle according to the invention viewed from different perspectives.
Figure 2:
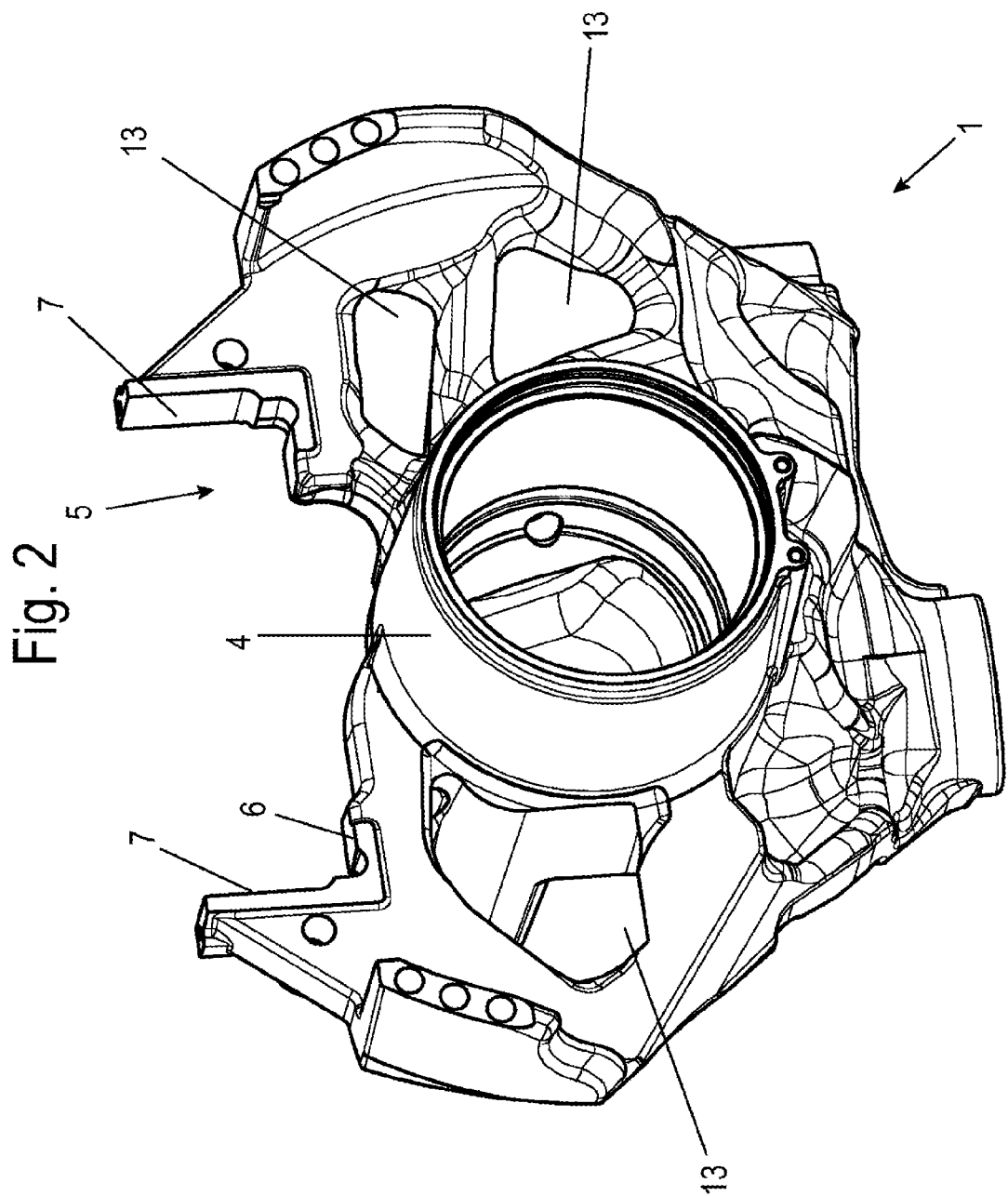
Figure 3:
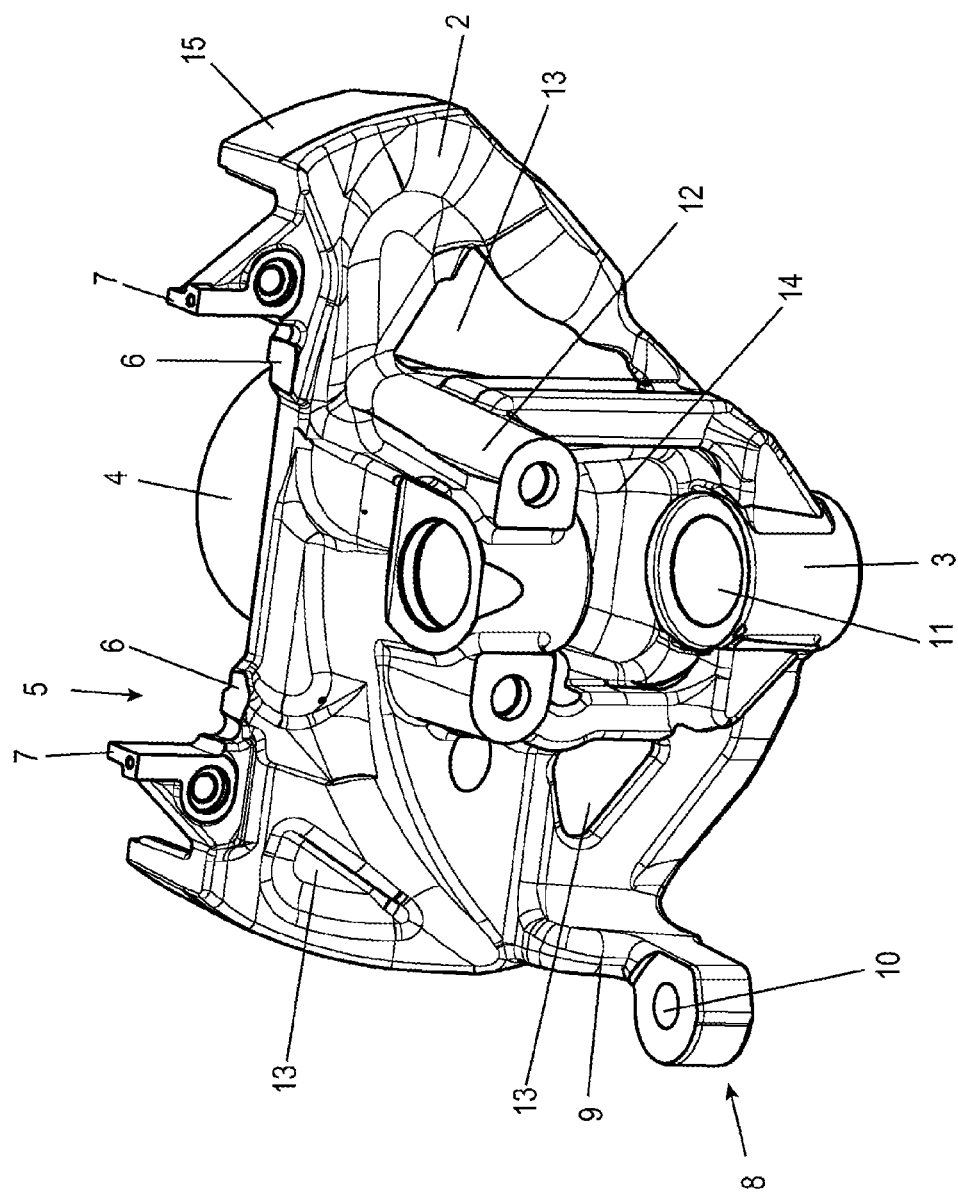
FIGS. 3 and 4 are schematic perspective illustrations of a second embodiment of a steering knuckle according to the invention, said illustrations corresponding to those of FIGS. 1 and 2.
Figure 4:
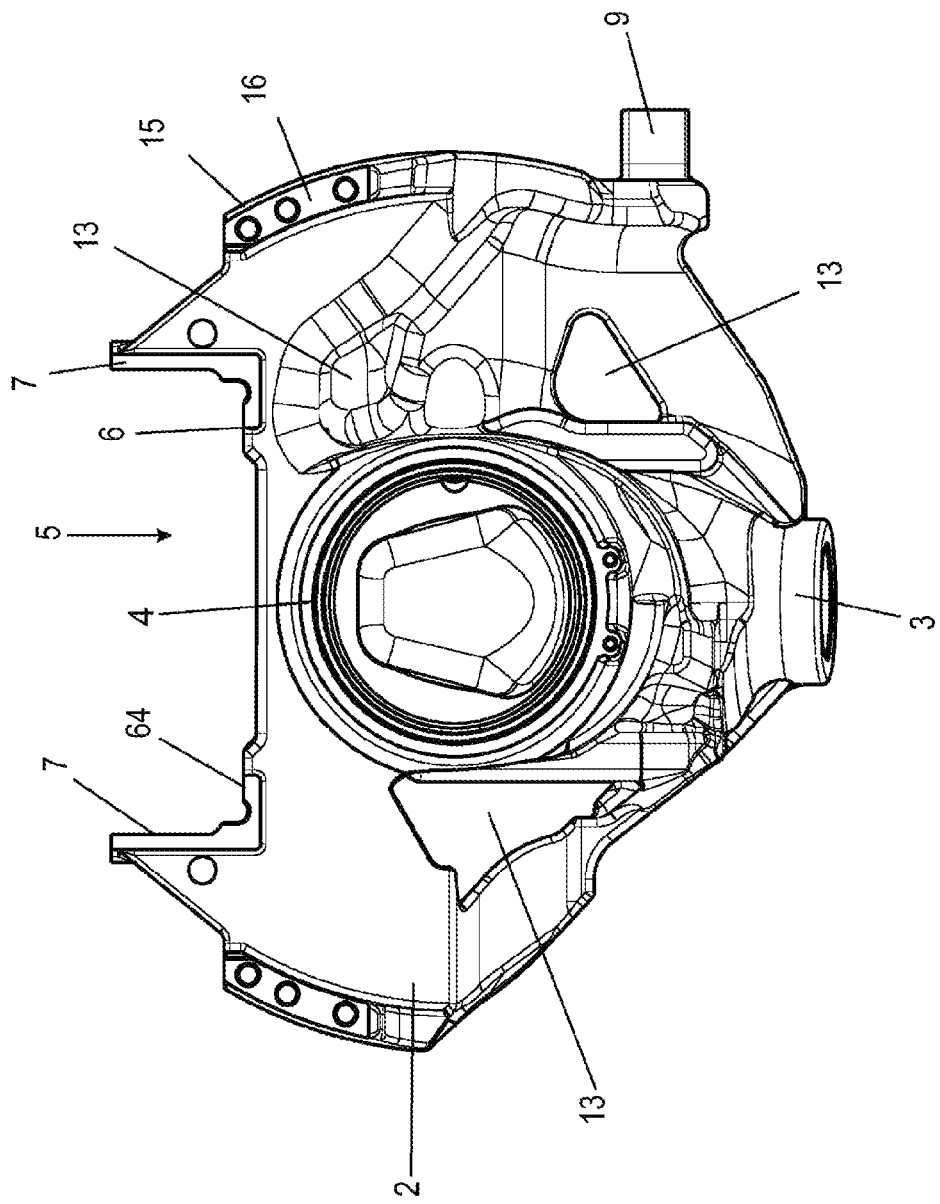

FIGS. 1 and 2 here show a first embodiment of such a steering knuckle 1, while FIGS. 3 and 4 show an alternative embodiment of a steering knuckle 1 according to the invention.

Both embodiment variants of such a steering knuckle 1 have a main body 2, a steering knuckle bearing 3 having an upper and a lower protrusion 12, the latter having bores 11 provided therein for receiving a journal for rotatably coupling to a wheel axle, extending from said main body 2.

A hub-type receptacle 4, which in the manner of a pot is open toward the rim of the vehicle wheel, extends from the main body 2 toward the wheel rim (not shown). The receptacle 4 serves for receiving a roller bearing and an axle journal, the latter by way of screws being coupled to the wheel rim and preferably also to the brake disc.

As can be furthermore derived from FIGS. 1 to 4, a pad receptacle 5 for receiving a brake pad, having a support face 6 and two support elements 7 that are disposed in succession in the rotating direction of the vehicle wheel, is molded on the main body 2 above the one protrusion 12 that serves for receiving the journal for establishing the vehicle axle.

The support elements 7 here are preferably shaped in the form of support yokes. The support faces 6 in the form of planar faces are molded on the main body 2 so as to be in front of respective, mutually facing internal sides of the support elements 7, a brake pad being able to be supported in relation to the rotation axis of the vehicle wheel on said internal sides.

As is shown in FIGS. 1 and 2, a recess 17 which serves substantially for saving weight on the steering knuckle 1 is molded between the two support faces 6.

In the variant of the embodiment shown in FIGS. 3 and 4, the main body 2 is shaped such that a rectilinear connecting web is molded between the support faces 6, said connecting web, by a step, being slightly lowered relative to the support faces 6.

As can be moreover derived from FIGS. 1 and 3, a control arm attachment 8 for attaching an axle control arm, for example a transverse control arm or a tie rod, is molded on the main body 2. The control arm attachment 8 here extends in an angular manner from the main body 2 to the protrusions 12 that form the steering knuckle bearing 3, so as to be approximately lateral to the steering knuckle bearing 3.

The control arm attachment 8 here is composed of an arm 9 which projects from the main body 2 of the steering knuckle 1 and on the free end of which a bore 10 in which a journal for attaching to the axle control arm is able to be received is provided.

As is furthermore shown in FIGS. 1 to 4, the main body 2 has at least one cutout 13. In the exemplary embodiments shown in the figures, each of the main bodies 2 has a multiplicity of such cutouts 13.

The cutouts 13 serve for saving weight on the steering knuckle 1, on the one hand.

At the same time, the lattice construction of the main body 2 formed as a result ensures an improved dissipation of the heat created in a braking procedure, said heat being caused by the friction between the mating brake disc and brake pad.

As is shown in particular in the embodiment variant according to FIG. 3, a cavity 14 provided with ribs is molded on the main body 2, in the region of the steering knuckle bearing 3, said cavity 14 separating the region of that part of the steering knuckle 1 that points toward the vehicle axle from that part of the steering knuckle 1 that faces the vehicle wheel.

The wall of this cavity 14 that is provided with ribs here simultaneously forms the base of the receptacle 4 for receiving the roller bearing and the axle journal.

An overlap region 15 for engaging across a brake disc (not illustrated) is molded on the main body 2 so as to be radially further outside toward the support elements 7 in relation to the receptacle 4.

This overlap region 15, as is shown in FIGS. 2 and 4, on the end face 16 thereof that faces the vehicle wheel, is configured as a flange for fitting a portion of a brake mount.

The steering knuckle 1, composed of a casting material, as a result of the shape thereof, in particular as a result of the hub-type receptacle 4 which in the shape of a pot, for receiving the roller bearing and the axle journal, is open toward the rim of the vehicle wheel, in which the axle journal preferably widens radially toward the wheel rim, is sufficiently stable so as to also absorb loads of a lateral crash in which a vehicle wheel, transversely to the travel direction, impacts an edge such as a curb, for example. Such a load is tested in particular in the so-called curb-impact test, the latter simulating the utility vehicle sliding as well as impacting a curb perpendicularly to the travel direction.

FIG. 5 shows a disc brake of a utility vehicle that is disposed on a steering knuckle 1 illustrated in FIGS. 3 and 4, as well as a shaft journal 23 and a wheel mount 21.

The steering knuckle 1, preferably made from spheroidal cast iron, by way of the steering knuckle bearing 3 is connected to an axle mount 10 so as to be articulated about a vertical rotation axis. A brake disc 2 here engages across the hub-type receptacle 4 of the steering knuckle 1

FIG. 5 furthermore shows a brake cylinder 25, a brake caliper 26 that spans the brake disc 2, and brake pads 27 that are disposed in the brake caliper 26 so as to be on both sides of the brake disc 20. A kingpin 19 which is rotatably mounted in a recess of the steering knuckle bearing 3 is received in the steering knuckle bearing 3.

A wheel mount 21 is provided for fitting a vehicle wheel, the rim of a vehicle wheel (not shown) being able to be assembled thereon using a multiplicity of wheel screws 24.

The wheel mount 21 and the brake disc 20, as is shown in FIG. 5, by way of a roller bearing 23 are mounted so as to be rotatable about a wheel rotation axis relative to the steering knuckle 1. To this end, the roller bearing 23 is received in the hub-type receptacle 4 of the steering knuckle 1.

As is furthermore shown in FIG. 5, the roller bearing 23 serves for mounting a shaft journal 22 which bears in a friction-fitting manner on a bearing inner ring of the roller bearing 23. The shaft journal 22, preferably made from cast iron, is connected in a rotationally fixed manner to the wheel mount 21.

The brake disc 20 per se has a friction ring and a cover which extends perpendicularly to the friction face of the friction ring, the free end of said cover being disposed between a neck portion of the wheel mount 21 and a flanged region of the shaft journal 22. The brake disc 20 furthermore has a flanged region which is molded on the internal circumference of the cover of the brake disc 20 and is provided with through bores, screws 28 that are screwed into the flange of the wheel mount 21 penetrating said through bores.

LIST OF REFERENCE SIGNS

1 Steering knuckle
2 Main body

3 Steering knuckle bearing
4 Receptacle
5 Pad receptacle
6 Support face
7 Support element
8 Control arm attachment
9 Arm
10 Bore
11 Bore
12 Protrusion
13 Cutout
14 Cavity
15 Overlap region
16 End face
17 Recess
18 Axle mount
19 Kingpin
20 Brake disc
21 Wheel mount
22 Axle journal
23 Roller bearing
24 Wheel screw
25 Brake cylinder
26 Brake caliper
27 Brake pad
28 Screw

What is claimed is:

1. A steering knuckle, composed of a casting material, of a utility vehicle, comprising:
   a main body composed of a cast material;
   a steering knuckle bearing;
   a hub-type receptacle which, in the shape of a pot for receiving a roller bearing and an axle journal, is open toward a rim of a vehicle wheel;
   a pad receptacle for receiving a brake pad, the pad receptacle having a support face and two support elements that are disposed in succession in a rotating direction of the vehicle wheel; and
   a control arm attachment molded on the main body for attaching an axle control arm,
   wherein the main body has at least one cutout.

2. The steering knuckle as claimed in claim 1, wherein the control arm attachment is molded laterally to the steering knuckle bearing so as to extend from the main body.

3. The steering knuckle as claimed in claim 2, wherein the control arm attachment is configured as an arm protruding from the main body of the steering knuckle, and having a bore on the free end of said arm.

4. The steering knuckle as claimed in claim 1, wherein a cavity is molded in the main body in a region of the pad receptacle, between the support faces.

5. The steering knuckle as claimed in claim 1, wherein the main body has an overlap region for engaging across a brake disc.

6. The steering knuckle as claimed in claim 5, wherein the overlap region on an end face thereof that faces the vehicle wheel is configured as a flange for fitting a portion of a brake mount.

\* \* \* \* \*